United States Patent Office 3,215,498
Patented Nov. 2, 1965

3,215,498
METHOD OF ANALYSIS OF POLYPHENYL MIXTURES BY THIN-LAYER CHROMATOGRAPHY
Helmut Schlitt, Masmago, Italy, assignor to Commissariat à l'Énergie Atomique, Paris, France
No Drawing. Filed Oct. 11, 1962, Ser. No. 229,979
Claims priority, application Germany, Oct. 19, 1961,
E 21,848
2 Claims. (Cl. 23—230)

Nuclear reactors are already known among those at present in operation or under construction, which employ as a coolant or as a moderator a liquid having a polyphenyl base.

Since the coolant is essentially composed of triphenyl and possibly also diphenyl which, during the operation of the reactor at approximately 400° C., resolves as a result of radiolysis and pyrolysis into a very complex mixture of substances, it is very important both for the development engineer and the chemist to know and to verify the composition of such mixtures. It has been proved that for this purpose, the method of thin-layer chromatography was in certain cases particularly effective as compared with the other methods of chromatographic separation.

A particular problem arises from the need to obtain visual definition and color variation of the spots appearing on the chromatographic plate, this requirement being met by means of a single indicator which is sensitive to as large a number of constituent elements of the mixture as possible. It has been found that the most effective results are achieved when provision is made in accordance with the invention for the use of an indicator in the form of a sprayed reagent consisting of a solution of tetravalent cerium sulphate in concentrated nitric acid.

The solution employed for the practical application of the method of analysis forming the subject of the present invention can contain between 0.1% and 1.0% tetravalent cerium sulphate in concentrated nitric acid. Good results are obtained in particular with a 0.3% solution. By way of example, such a solution has been employed for the analysis of the following substances:

(1) Diphenyl (pure)
(2) o—Terphenyl
(3) m—Terphenyl
(4) p—Terphenyl
(5) 4′, 4″-tetraphenyl
(6) 2′, 2″-tetraphenyl
(7) 3′, 3″-tetraphenyl
(8) Dixenyl-methane 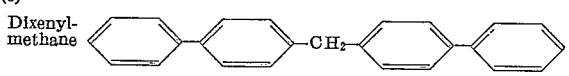
(9) Triphenyl
(10) 4′, 3″, 3‴-pentaphenyl
(11) 4′, 3″, 2‴, 4‴-hexaphenyl
(12) 4′, 4″, 4‴-pentaphenyl Optimum visual location and production of distinguishing colors have been achieved under the following conditions:

Adsorbent _____ Silica gel, G quality (Merck standard —U.S.A.).
Elution liquid ___ 50% Hexane, 50% $CCl_4$.
Indicator _____ Solution of tetravalent cerium sulphate in concentrated nitric acid.
Height of rise ___ 10 cms.
Quantity employed 5 /μg.
Substances _____ (1) to (12).

A very good range of distinguishing colors has accordingly been obtained. Under daylight lighting conditions, ten substances can readily be recognized:

(1) Light yellow        (7) Violet
(2) Light yellow        (8) Yellow
(3) Red                 (9) Sepia
(4) Brown               (10) Blue
(6) Light brown         (11) Greenish yellow One of the unexpected properties of the indicator which has thus been found is that the indications provided by the spots are further improved to a substantial extent beyond the visible light region, in the ultraviolet light region. The relatively indeterminate coloring of spots (1) and (6) as obtained in the visible light region after spraying must be given clearer definition by the use of long-wave ultraviolet rays. By way of non-limitative example, good results have been obtained with a radiation wavelength of 3660 Angstrom units.

As stated in the foregoing, the indicator has been sprayed on to the plate; after consecutive drying, the spots have been made visible by coloring. As a result of successive spraying operations interspersed with intermittent exposures to ultraviolet radiation, the coloring is very substantially improved.

What I claim is:
1. Method of analysis of polyphenyl mixtures by thin-layer chromatography, characterized in that there is employed as a color indicator a 0.1–1.0% solution of tetravalent cerium sulphate in concentrated nitric acid.
2. Method as claimed in claim 1, in which there is employed a 0.3% solution of cerium sulphate in concentrated nitric acid.

References Cited by the Examiner
Analytical Chemistry, vol. 27, Jan.-June 1955, article, "Rapid Spot Tests for Identification of Biphenyl, o, m, and p-Terphenyl and Certain Other Polyphenyls," by Silverman and Bradshaw., pp. 96-99 relied on.
Chemistry of Specific, Selective and Sensitive Reactions, by Feigl, copyright 1949, by Academic Press, Inc., 125 E. 23rd St., N.Y. 10, N.Y., pp. 376–377 relied on.

MORRIS O. WOLK, *Primary Examiner.*